T. R. WILSON

Sept. 13, 1932. UNIFORM COMPRESSION INTERNAL COMBUSTION ENGINE Re. 18,595

Original Filed May 4, 1926 2 Sheets-Sheet 1

Inventor
Theodore R. Wilson,
By Samuel Herrick,
Attorney

T. R. WILSON

Sept. 13, 1932. UNIFORM COMPRESSION INTERNAL COMBUSTION ENGINE Re. 18,595

Original Filed May 4, 1926

2 Sheets-Sheet 2

Inventor

Theodore R. Wilson

By Samuel Herrick

Attorney

Reissued Sept. 13, 1932

Re. 18,595

UNITED STATES PATENT OFFICE

THEODORE R. WILSON, OF PESHASTIN, WASHINGTON, ASSIGNOR, BY DIRECT AND MESNE ASSIGNMENTS, OF ONE-THIRD TO BROOKS WALKER, PIEDMONT, CALIFORNIA, ONE-THIRD TO HARRY E. KENNEDY, OF BERKELEY, CALIFORNIA, AND ONE-THIRD TO CLINTON L. WALKER, OF PIEDMONT, CALIFORNIA

UNIFORM COMPRESSION INTERNAL-COMBUSTION ENGINE

Original No. 1,639,477, dated August 16, 1927, Serial No. 106,638, filed May 4, 1926. Application for reissue filed July 31, 1929. Serial No. 382,413.

This invention relates to a uniform compression internal combustion engine and its object is to provide a mechanism of this character so constructed that the maximum efficiency in operation is secured.

Extensive and accurate tests that I have made disclose the fact that there is a direct relation between the intake manifold pressure of an internal combustion engine and the pressure in the cylinder of such engine; that is, the pressure in the intake manifold, between the throttle of the carburetor and the interior of the cylinder, is always in direct proportion to the pressure in the combustion chamber at the top of the compression stroke. Therefore, broadly stated, the present invention resides in providing an internal combustion engine cylinder with a movable abutment and affecting the adjustment of said abutment control by and in accordance with the intake manifold pressure.

The advantages of the invention will be set forth in the detailed description which follows.

Figure 1:
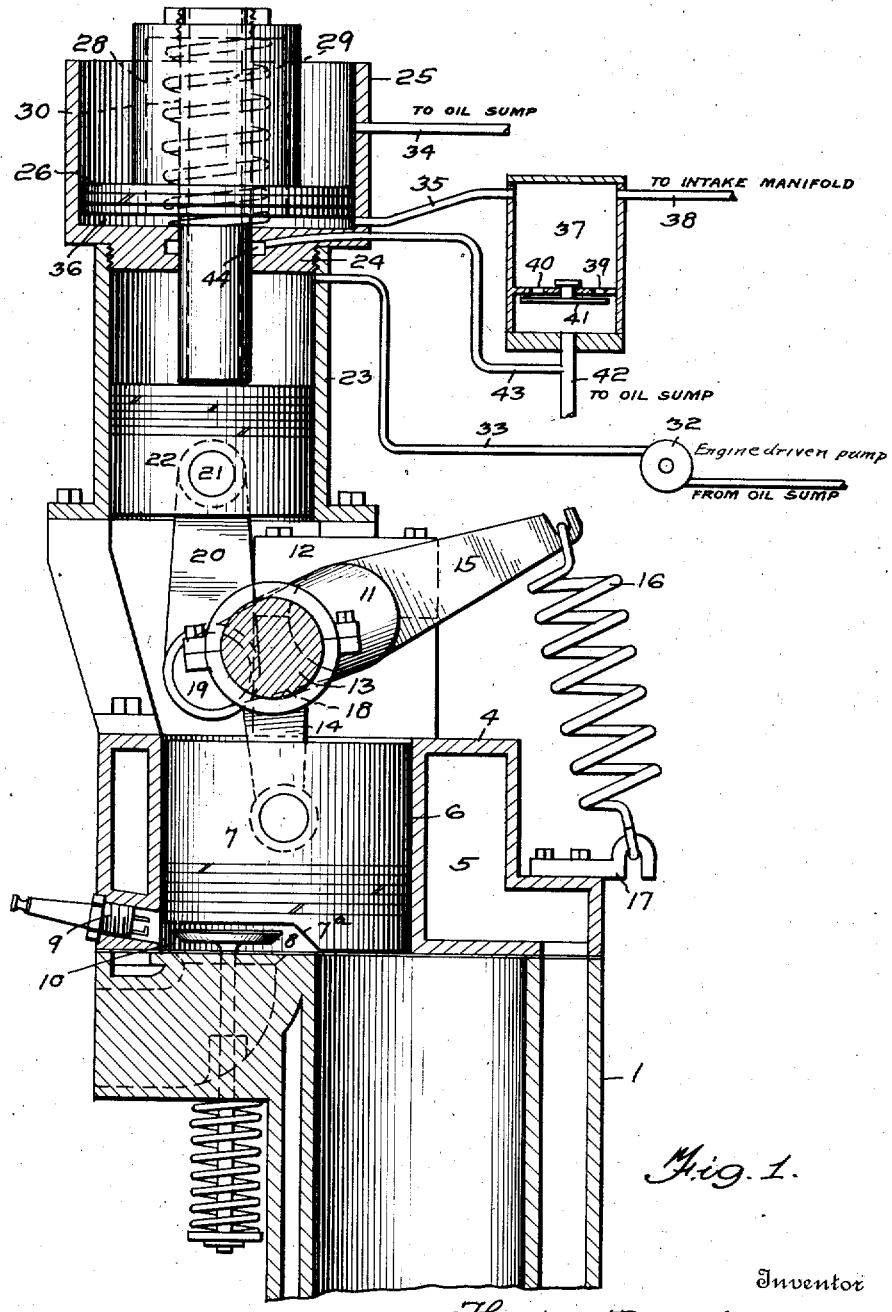
Figure 2:
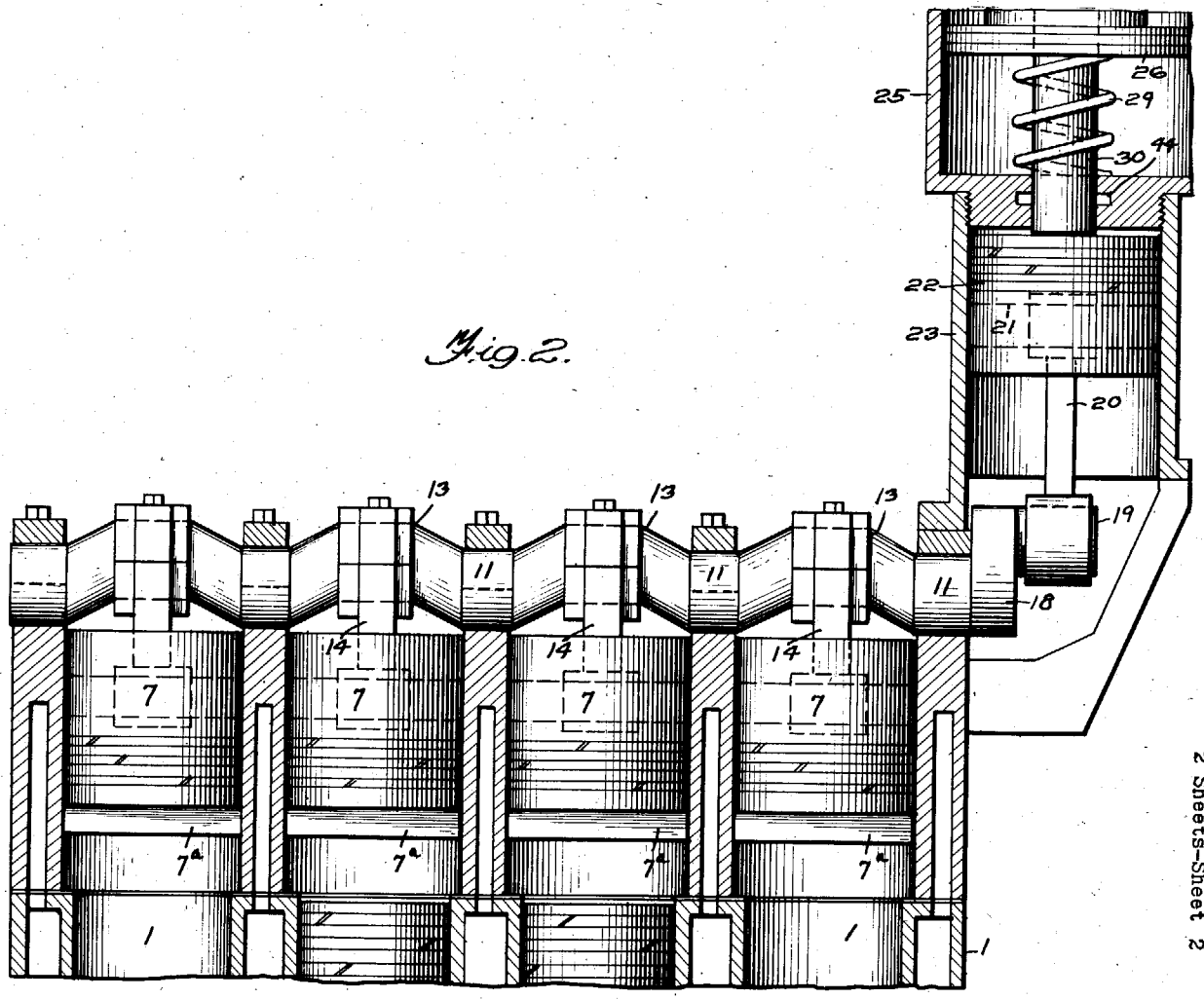

In the accompanying drawings:

Fig. 1 is a vertical sectional view of a portion of an internal combustion engine, having the invention applied thereto and Fig. 2 is a partial longitudinal sectional view through said engine.

Like numerals designate corresponding parts in both of the figures of the drawings.

It is to be understood that the drawings are merely illustrative. The particular arrangement of parts may be varied within wide ranges without departing from the spirit of the invention. Referring to the drawings, 1 designates an engine having a plurality of cylinders 2, formed therein. As each cylinder and its associated parts are substantially identical a description of one will serve as a description of all. The cylinder 4 is water-jacketed as indicated at 5 and is provided with auxiliary cylinders 6 of a diameter somewhat greater than the engine cylinders and out of line with respect to the engine cylinders. Pistons or compression abutments 7 are disposed in the cylinders 6, said abutments being cut away as indicated at 7ª to permit the engine valves 8 to function. A spark plug opening 9 is formed adjacent each of the valve clearance spaces 10. A rock shaft 11 extends lengthwise of the engine and is supported in bearings 12. The rock shaft carries a plurality of cranks lying in the same position with respect to shaft 11 and these several cranks are connected by connecting rods 14 with the corresponding abutments 7. A crank arm 15 of the shaft 11 is engaged by one end of the spring 16, the other end of this spring being engaged with a bracket 17 upon the cylinder head 4.

At some point in its length the shaft 11 is provided with a crank 18 which is somewhat longer than the cranks 13 and the crank pin 19 of the crank 18 is connected by a connecting rod with the wrist pin 21 of a piston 22. Piston 22 has a working fit in a cylinder 23, the head of which is formed by the bottom 24 of an additional cylinder 25. A piston 26 has a working fit in the cylinder 25, the last named piston carrying a housing 27 which has a hollow interior 28. A stout spring 29 bears between the top of the housing 27 the bottom 24 of the cylinder and tends to thrust the piston 26 and its associated parts upward. A tube 30 is secured to and moves bodily with the housing 27, said tube having a tight working fit in the bottom 24 of the cylinder 25, and said tube having an open lower end which is parallel with the upper face of the piston 22.

A suitable pump 32, preferably of the rotary gear type, forces oil through a pipe 33, from the sump of the engine, to the space within the cylinder 23 above the piston 22. An overflow pipe 34 leads from the interior of the cylinder 25 back to the engine oil sump. Conduit 35 leads from the space 36 beneath the piston 26 to a chamber 37 which is in communication with the intake manifold of the engine through a conduit 38. Chamber 37 is spanned by a false bottom 39, having outlets 40, which are controlled by a gravity opening check valve 41. The space beneath the check valve is connected by a pipe 42 with the engine oil sump. A conduit 43 is connected to the pipe 42 and to an annular chamber 44 formed about the tube 30 and in the lower end or bottom of the cylinder 25.

The operation of the device is as follows: Since the suction of the intake manifold is operative upon the lower side of piston 26 and tends to draw this piston downwardly and since the spring 29 tends to thrust this piston upwardly it follows that this piston will occupy varying positions of vertical adjustment corresponding to the existing degree of pressure in the intake manifold. Since the tube 30 is connected rigidly to the piston 26 the lower end of this tube will be caused to approach or recede from the top of the piston 22, as it moves up and down. With the engine running there will be a constant inflow of oil through pipe 33 under the influence of the rotary gear pump 32, which is engine driven. The only way of escape for this oil is upwardly through tube 30. The oil passing from the upper end of the tube overflows into the cylinder 25 and passes off through the overflow pipe 34 back to the sump.

Manifestly the rate of escape of the oil will be determined by the position of the lower end of the tube with respect to the top of the piston 22 and consequently the degree of pressure upon the piston 22 will likewise be determined by the position of this tube. Thus when the suction in the manifold is such as to draw piston 26 downwardly and thereby constrict the escape area of the oil, the pressure upon piston 22 will be increased and said piston will be thrust downwardly. Downward movement of piston 22 acts through the associated parts and against the tension of spring 16 to rock shaft 11 and move the abutments 7, in unison, downwardly, thereby reducing the effective compression space within the several cylinders.

Thus it will be seen that the effective compression space within the several cylinders is controllably varied under the influence of variation in intake manifold pressures.

When the suction in the intake manifold decreases and the piston 26 rises under the influence of spring 35 increased escape area is provided and the oil pressure upon piston 22 is decreased, and spring 16 acts to lift the abutments 7 and correspondingly increase the compression space in the several cylinders.

I have found in actual practice that the device of the present invention is extremely sensitive and reliable in operation and that it will serve to maintain ideal compression pressure under all conditions. It is necessary that the abutments be raised almost instantly, whenever the throttle is suddenly opened. The present apparatus efficiently accomplishes this result. The instant that the throttle is opened and the partial vacuum in the intake manifold is relieved the spring 29 quickly raises tube 30 and then the tension of spring 16 aided by pressure in the firing cylinder immediately forces the piston 22 to follow the control tube upwardly. Since the oil in cylinder 23 above piston 22 is always under more or less pressure and since tube 30 must be free to slide in 24 it is likely that a small amount of oil will travel upwardly past said tube and if it reaches the space beneath the piston 26 it might work over into the manifold and be drawn into the engine. Furthermore oil might work into the space beneath piston 26 by leakage past this piston. It is for these reasons that the space 24 is provided and the oil which reaches this space will be returned to the sump through tubes 43 and 42.

To trap any oil which gets into the tube 35, chamber 37 is provided. During periods of low vacuum in the intake manifold the check valve 41 will drop by gravity and permit any oil which has accumulated in the cylinder 37 to pass downwardly into the tube 42.

It is to be understood that the invention is not limited to the precise construction set forth; since the principles involved may be embodied in apparatus of varying kinds. For example the present construction has to do with poppet valve engines but it is manifest that the underlying principles are applicable to sleeve or rotary valve type engines. Therefore it is to be understood that the invention includes within its purview whatever changes fairly come within either the terms or the spirit of the appended claims.

Having described my invention what I claim is:

1. The combination with an internal combustion engine and its cylinders of a movable compression abutment and means under control of the intake manifold pressure of said engine for varying the position of said abutment in accordance with variations in said intake manifold pressure.

2. The combination with a multiple cylinder internal combustion engine of an adjustable compression abutment for each of the said cylinders and means for simultaneously adjusting the position of all of said abutments under the influence of variations of intake manifold pressure.

3. The combination with a multiple cylinder internal combustion engine of a compression piston for each of said cylinders, a rock shaft having cranks attached to the several compression pistons and a piston for moving said rock shaft said piston being under control of intake manifold pressure.

4. The combination with a multiple cylinder internal combustion engine of compression abutments for the several cylinders thereof, a piston the movement of which determines the position of said compression abutments, a constant pressure fluid supply for action upon said piston, and an escape for said pressure fluid the capacity of which is varied under the influence of intake manifold pressure.

5. A structure as recited in claim 4 wherein said escape comprises an open ended tube movable toward and from said piston and a second piston by which said tube is carried the last named piston being subjected to intake manifold pressure.

6. The combination with a multiple cylinder internal combustion engine of abutment pistons constituting the compression elements of the several pistons, a rock shaft having a plurality of cranks connected by connecting rods with the several abutments, spring means tending to rock said shaft in one direction, a fluid pressure cylinder, a piston in said cylinder connected to the rock shaft acting to move said rock shaft against the tension of said spring, an engine driven oil pump for pumping oil into the cylinder to act upon the piston, a second cylinder and piston one side of the last named piston being subjected to intake manifold pressure, a spring acting upon the last named piston and tending to move it in opposition to the intake manifold pressure and an escape tube connected to the last named piston and constituting an escape for the oil, the escape capacity of which is determined by the proximity of the end of said tube to the said piston.

7. A structure as recited in claim 6 wherein the oil which escapes from the escape tube overflows into the cylinder of the piston by which said tube is carried and means for conducting the oil of overflow from said cylinder to the engine sump.

8. A structure as recited in claim 6 wherein the means for subjecting the piston to intake manifold pressure comprises a conduit having an oil trap in its length.

9. A structure as recited in claim 6 wherein the means for subjecting the last named piston to intake manifold pressure comprises a conduit leading to the intake manifold and having an oil trap in its length and means for conducting the oil from said oil trap to the engine sump.

10. A structure as recited in claim 6 in combination with means for returning oil of leakage past said tube to the engine sump.

11. A mechanism for varying the compression ratio of an internal combustion engine, which consists in the combination with a cylinder and its piston, of means controlled by variations in pressure during the intake cycle for automatically increasing the compression ratio when the pressure during the intake cycle decreases, and conversely for decreasing the compression ratio when the pressure during the intake cycle increases, said compression ratio remaining a constant over cycles of like intake pressures regardless of speed variations of the engine.

12. The combination with the head, the cylinder and the piston of an internal combustion engine, of means actuated by the difference in pressure between the atmosphere and the pressure existing in the cylinder and manifold during the suction cycle of the engine for changing the clearance volume between the piston and the head.

13. The combination with the head, the cylinder and the piston of an internal combustion engine, of means actuated by the difference in pressure between the atmosphere and the pressure existing in the cylinder and manifold during the suction cycle of the engine for changing the compression ratio.

14. The combination with the head, the cylinder and the piston of an internal combustion engine, of means actuated by the difference in pressure between the atmosphere and the pressure existing in the cylinder and manifold during the suction cycle of the engine for automatically changing the clearance space between the head and the piston during the compression cycle so as to either increase or decrease the compression ratio.

15. The combination with a multiple cylinder internal combustion engine having reciprocable pistons within said cylinder, an engine main shaft, connections between said pistons and said engine main shaft, and means for automatically changing the clearance volume in all the cylinders simultaneously and to the same degree by forces within said engine, whereby said clearance volume will increase automatically during an increase of engine torque and decrease automatically during a decrease of engine torque.

16. The combination with a multiple cylinder internal combustion engine having reciprocable pistons within said cylinder, an engine main shaft, connections between said pistons and said engine main shaft, and means actuated by variations in internal engine pressures for automatically changing the clearance volume in the cylinders simultaneously and to the same degree.

THEODORE R. WILSON.